United States Patent Office 3,168,734
Patented Feb. 2, 1965

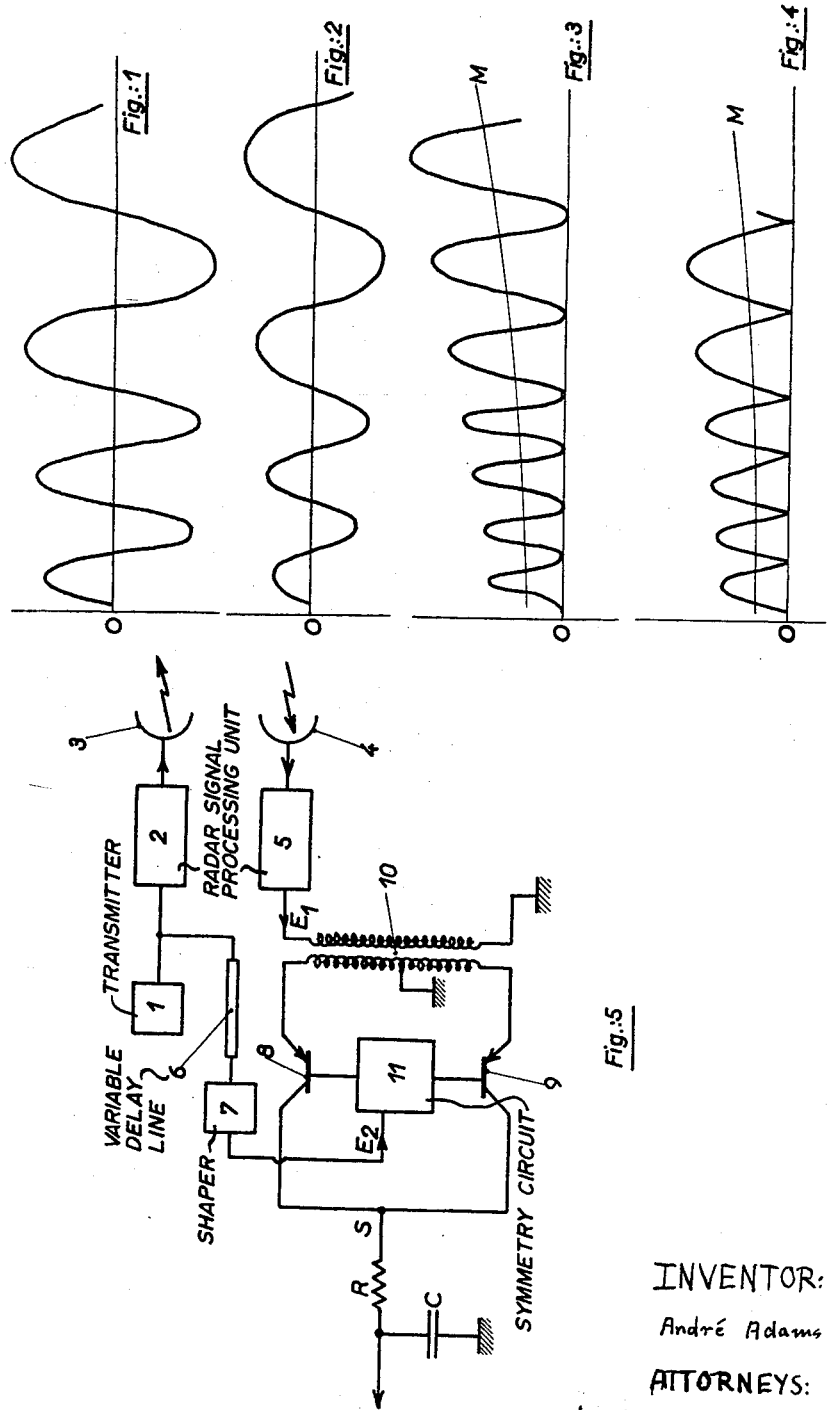

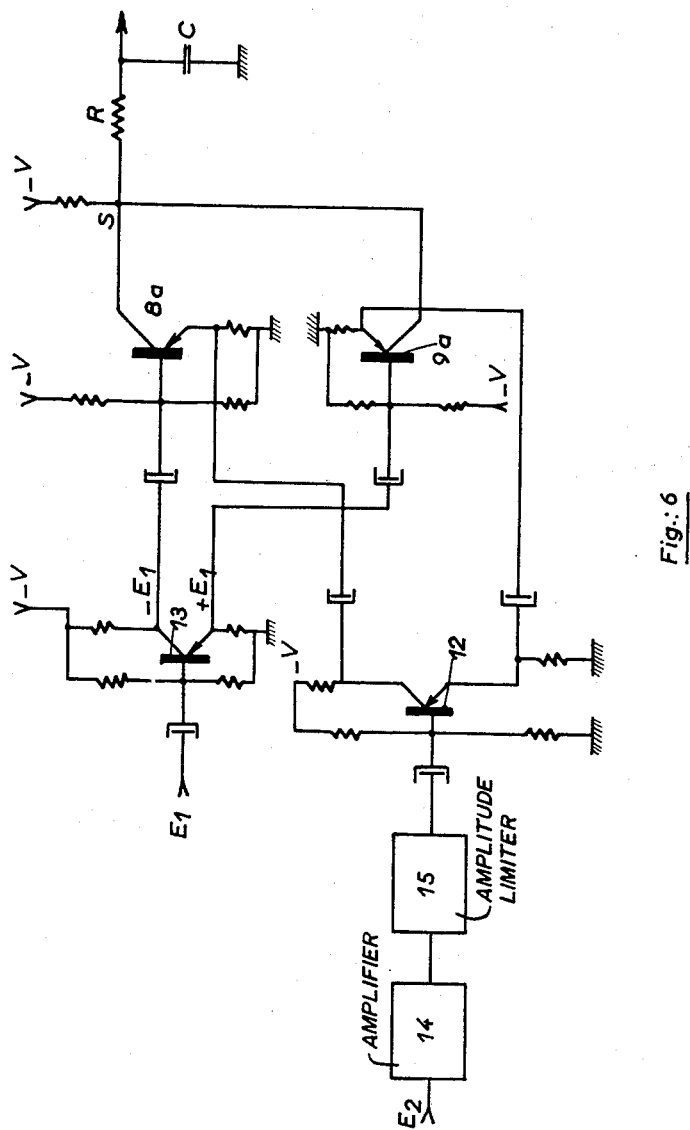

3,168,734
APPARATUS FOR CORRELATION IN RADAR INSTALLATIONS
André Adamsbaum, Boulogne-Billancourt, France, assignor to Societe Nationale d'Etude et de Construction de Moteurs d'Aviation, Paris, France
Filed Apr. 6, 1962, Ser. No. 188,920
Claims priority, application France, Apr. 6, 1961, P.V. 857,962
2 Claims. (Cl. 343—12)

The correlation of two signals is an operation well known to those skilled in the art: it consists in the first place of a multiplication of the two signals one by the other and then a filtering or integration of the result. The object of this operation is generally to take the best advantage of a useful signal which is strongly affected by noise or jamming.

The linearity of the multiplier is considered to be fundamental. This means that if it is necessary to obtain the product of two voltages $v$ and $V$ with a multiplier which gives a resultant voltage $K(vV+\epsilon)$, in which $K$ is a constant and $\epsilon$ represents the imperfection of the multiplier, it is necessary that $\epsilon$ should be as small as possible. More precisely, it is necessary that the signal $\epsilon$, after filtering or integration, should be as small as possible compared with the signal $vV$ after the same operations.

The operation of a correlator may be explained by considering signals having a narrow spectrum having regard to their central frequency and assuming that the two signals are uncertain (noise for example).

If they are examined for a very short duration as compared with the inverse of the width of their spectrum, it is found that they evolve according to a sinusoidal law as a function of time. If the period of observation is extended beyond the inverse of the width of the spectrum, variations of amplitude and of phase are found. It is precisely these variations which prevent the width of the spectrum from having a zero value.

The "mathematical" correlator operates in the following manner: it receives these two almost sinusoidal waves (shown in FIGS. 1 and 2) and multiplies them one by the other at every instant (see FIG. 3, in which the curve M indicates the mean value), which, after integration, gives a continuous voltage, the magnitude of which increases with the time of integration.

The noise which interferes with the signal carrying the useful information gives by multiplication a mean voltage of zero.

The multiplier profits from the fact that it utilizes a sample of the signal free from noise; it "knows" which signal it will receive and what the phase and relative amplitude will be. It applies a negative weight to the half wave which it foresees as negative and vice-versa; furthermore, it gives the large amplitudes of the useful signal a greater weighting than the small amplitudes, which is an advantage from the point of view of utilization, since the small amplitudes are more strongly affected by noise than the others.

In practice, this operation of correlation, which is the direct transposition of the corresponding mathematical operation, requires a multiplier which it is difficult to produce.

The present invention has for its object a correlator which is slightly less perfect from the strictly mathematical point of view but the construction of which is substantially more easy and finally, having superior performance. Without going as far as to give a different weighting according to the amplitude of the useful signal, the device of the invention is limited in respect of the single condition of polarity. It thus provides a correlation which becomes better as the amplitude modulation of the signal becomes smaller.

In practice, the multiplier of the present invention has the effect of multiplying the incident signal by $+1$ or $-1$, depending on the sign of the local signal, the signal thus multiplied being shown in FIG. 4. In this way, only the changes of sign of this signal retain any importance.

This operation can be effected in a simple and sure manner by devices which are much less delicate than those which carry out the multiplication in the mathematical sense of the term.

The description which follows below with reference to the accompanying drawings (given by way of example only and not in any limitative sense) will make it quite clear how the invention will be carried into effect, the special features which are brought out either in the text or in the drawings being understood to form part of the said invention.

FIGS. 1 and 2 show signals to be multiplied.
FIGS. 3 and 4 show the result obtained respectively with a "mathematical" multiplier and with a multiplier in accordance with the invention.
FIG. 5 is a connection diagram according to the invention in its application to radar.
FIG. 6 shows the details of an alternative form of embodiment.

In FIG. 5, the signal generated by a transmitter 1 is applied after treatment in a suitable stage 2 to the transmitting aerial 3. After reflection, it is collected by the receiving aerial 4 and suitably treated at 5 before being applied to one of the inputs $E_1$ of the multiplier. We are here concerned with the signal to be utilized, which it is necessary to multiply by a pilot signal or reference signal having the same frequency and the same phase as the utilization signal.

The most simple method of obtaining a pilot signal of the kind required is to derive it from the transmission channel, for example from the output side of the transmitter 1, and to give it a pre-determined delay corresponding to a given distance from the target, this distance being arbitrarily chosen in advance; this is readily effected by means of a delay-line 6. The signal thus delayed is converted at 7 to an approximately rectangular signal having the same sign at every instant as the signal before conversion, and is then applied to the other input $E_2$ of the multiplier. The stage 7 is conventional and well known to people skilled in the art; an example of such stage is described in "Reference Data for Radio Engineers," International Telegraph & Telephone, 4th edition, 1956, pages 468–9, FIGS. 20–21.

The multiplication of the received signal and the pilot signal is effected, by way of example, in a circuit comprising two identical transistors 8 and 9, to which are applied, through a transformer 10 and a stage 11 which prepares from the signal at $E_2$, two rectangular signals opposite and changing sign at the same time as the said signal at $E_2$, symmetrical voltages derived from the asymmetric inputs $E_1$ and $E_2$.

Depending on the sign of the signal applied at $E_2$, one or the other of the two transistors 8 and 9 is rendered conducting and the signal applied at $E_1$ is passed to a circuit RC acting as an integrator, after having undergone or not a change of sign.

This device satisfactorily carries out the operations described above. As compared with the "mathematical" correlator, it offers advantages of simplicity, ease of construction by means of semi-conductors, and an excellent linearity from the input $E_1$ to the output S due to the all-or-nothing operation of the transistors 8 and 9.

It is quite obvious that in the presence of the Döppler effect, it is possible to carry out the integration by a band-pass filter, and that in addition the device can be improved while retaining the same principle of operation, by replacing each transistor 8 and 9 by two transistors, arranged so as to compensate for their imperfections.

FIG. 6 shows an alternative form of construction of the correlator, enabling any transformer to be dispensed with by the use of the additional transistors 12 and 13 connected as de-phasers, the transistor 13 receiving the signal $E_1$ to be utilized, while the transistor 12 receives the reference signal $E_2$, after treatment in an amplifier 14 followed by an amplitude-limiter 15.

The circuit is arranged in such manner that on the collector and the emitter of the transistor 12 there appear equal and opposite voltages proportional to $E_1$ and having an absolute value in the vicinity of $E_1$ (these will be designated $-E_1$ and $+E_1$).

The transistor 12 carries out the same operation with respect to the reference signal $E_2$, suitably amplified at 14 and amplitude-limited at 15. The resultant signals are applied to the emitters of the transistors 8a and 9a, which in consequence become alternately blocked and unblocked.

They therefore permit the passage to the integrator network RC, either of the voltage $-E_1$ or the voltage $+E_1$, depending on whether the voltage $E_2$ is positive or negative.

A suitable choice of the transistors of FIG. 6 permits the construction of a circuit which is capable of operation up to frequencies of the order of a few multiples of ten megacycles.

It will be understood that modifications may be made to the forms of embodiment which have been described above, in particular by the substitution of equivalent technical means, without thereby departing from the scope of the present invention.

It is furthermore quite clear that the application to radar, which would appear to be the most advantageous, is not in any way limitative, and that it may be extended to all devices emitting an electro-magnetic or other wave and utilizing the echo of the said wave reflected by an obstacle in order to measure the distance of this latter.

What I claim is:

1. Correlation apparatus for use in radar or like installation having a transmitter for producing a pulsed signal which may be reflected as an echo from a remote object and a reciever for amplifying the echo signals, comprising in combination, means for deriving a reference signal from the transmitter, delay means coupled to the reference signal means for artificially delaying said reference signal in conformity with the natural delay encountered by the echo due to twice the distance of a reflecting remote object, shaping means for converting the delayed reference signal at said delay means to impulses of rectangular form, means providing from the rectangular impulses signals of opposite polarity and changing sign in synchronism with the reference signal, circuit means multiplying the signals produced by the last mentioned means with the echo signal from the receiver, and means integrating the signal produced by the multiplier.

2. Apparatus as defined in claim 1 wherein the multiplying means includes a circuit deriving symmetrical voltages from the rectangular pulses, a further circuit deriving symmetrical voltages from the echo signals, and two identical transistors having the respective symmetrical voltages derived from the rectangular pulses coupled to the base electrodes and having the respective symmetrical voltages derived from the echo signals coupled to the emitter electrodes.

No references cited.

CHESTER L. JUSTUS, *Primary Examiner.*